United States Patent
Li et al.

(10) Patent No.: US 7,310,367 B2
(45) Date of Patent: Dec. 18, 2007

(54) DATA DEMODULATION FOR A CDMA COMMUNICATION SYSTEM

(75) Inventors: Tao Li, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 10/688,145

(22) Filed: Oct. 17, 2003

(65) Prior Publication Data

US 2005/0083998 A1    Apr. 21, 2005

(51) Int. Cl.
*H04B 1/00* (2006.01)

(52) U.S. Cl. .................................................. 375/147

(58) Field of Classification Search ................ 375/147, 375/148, 149, 316, 324, 349, 142, 144, 150, 375/152; 370/320, 335, 342
See application file for complete search history.

(56) References Cited

U.S. PATENT DOCUMENTS

| | | | |
|---|---|---|---|
| 6,222,875 B1 | 4/2001 | Dahlman et al. | 375/200 |
| 6,295,023 B1 * | 9/2001 | Bloebaum | 342/357.06 |
| 6,628,631 B1 * | 9/2003 | Mazawa et al. | 370/331 |
| 2002/0136278 A1 * | 9/2002 | Nakamura et al. | 375/148 |
| 2002/0154615 A1 | 10/2002 | Hans et al. | |
| 2003/0067967 A1 * | 4/2003 | Miyoshi et al. | 375/148 |
| 2004/0017843 A1 * | 1/2004 | Fitton et al. | 375/148 |
| 2004/0071199 A1 * | 4/2004 | Boesel et al. | 375/150 |
| 2005/0277419 A1 * | 12/2005 | Takano et al. | 455/442 |

FOREIGN PATENT DOCUMENTS

WO    03063376    7/2003

* cited by examiner

*Primary Examiner*—Khanh C. Tran
*Assistant Examiner*—Sam K. Ahn
(74) *Attorney, Agent, or Firm*—Thomas Rouse; George C. Pappas; David J. Huffaker

(57) ABSTRACT

An integrated circuit that performs data demodulation on partially despread symbols includes a despreading unit, a channel compensation unit, and a symbol combiner. The despreading unit despreads input samples and provides despread symbols for a first code channel with a first spreading factor. The channel compensation unit multiplies the despread symbols with channel estimates and provides demodulated symbols. The symbol combiner combines groups of demodulated symbols to obtain recovered data symbols for a second code channel with a second spreading factor that is an integer multiple of the first spreading factor. The channel compensation and symbol combining are dependent on whether or not transmit diversity is used. For a TDM design, despread symbols for multiple first code channels are processed in a TDM manner, one channel at a time, to obtain recovered data symbols for multiple second code channels. The channel compensation unit and symbol combiner can be operated in a pipelined manner.

22 Claims, 12 Drawing Sheets

Memory Bank 1 (SF=16 Channels 0, 1, 2, 3, 8, 9, 10, 11)   1110a

| | | | | | | | |
|---|---|---|---|---|---|---|---|
| 0 | $S_{16,0,0}$ | $S_{16,0,1}$ | $S_{16,1,0}$ | $S_{16,1,1}$ | $S_{16,2,0}$ | $S_{16,2,1}$ | $S_{16,3,0}$ | $S_{16,3,1}$ |
| 1 | $S_{16,0,2}$ | $S_{16,0,3}$ | $S_{16,1,2}$ | $S_{16,1,3}$ | $S_{16,2,2}$ | $S_{16,2,3}$ | $S_{16,3,2}$ | $S_{16,3,3}$ |
| | ⋮ | ⋮ | ⋮ | ⋮ | ⋮ | ⋮ | ⋮ | ⋮ |
| 79 | $S_{16,0,158}$ | $S_{16,0,159}$ | $S_{16,1,158}$ | $S_{16,1,159}$ | $S_{16,2,158}$ | $S_{16,2,159}$ | $S_{16,3,158}$ | $S_{16,3,159}$ |
| 80 | $S_{16,8,0}$ | $S_{16,8,1}$ | $S_{16,9,0}$ | $S_{16,9,1}$ | $S_{16,10,0}$ | $S_{16,10,1}$ | $S_{16,11,0}$ | $S_{16,11,1}$ |
| | ⋮ | ⋮ | ⋮ | ⋮ | ⋮ | ⋮ | ⋮ | ⋮ |
| 159 | $S_{16,8,158}$ | $S_{16,8,159}$ | $S_{16,9,158}$ | $S_{16,9,159}$ | $S_{16,10,158}$ | $S_{16,10,159}$ | $S_{16,11,158}$ | $S_{16,11,159}$ |

Memory Bank 2 (SF=16 Channels 4, 5, 6, 7, 12, 13, 14, 15)   1110a

| | | | | | | | |
|---|---|---|---|---|---|---|---|
| 0 | $S_{16,4,0}$ | $S_{16,4,1}$ | $S_{16,5,0}$ | $S_{16,5,1}$ | $S_{16,6,0}$ | $S_{16,6,1}$ | $S_{16,7,0}$ | $S_{16,7,1}$ |
| 1 | $S_{16,4,2}$ | $S_{16,4,3}$ | $S_{16,5,2}$ | $S_{16,5,3}$ | $S_{16,6,2}$ | $S_{16,6,3}$ | $S_{16,7,2}$ | $S_{16,7,3}$ |
| | ⋮ | ⋮ | ⋮ | ⋮ | ⋮ | ⋮ | ⋮ | ⋮ |
| 79 | $S_{16,4,158}$ | $S_{16,4,159}$ | $S_{16,5,158}$ | $S_{16,5,159}$ | $S_{16,6,158}$ | $S_{16,6,159}$ | $S_{16,7,158}$ | $S_{16,7,159}$ |
| 80 | $S_{16,12,0}$ | $S_{16,12,1}$ | $S_{16,13,0}$ | $S_{16,13,1}$ | $S_{16,14,0}$ | $S_{16,14,1}$ | $S_{16,15,0}$ | $S_{16,15,1}$ |
| | ⋮ | ⋮ | ⋮ | ⋮ | ⋮ | ⋮ | ⋮ | ⋮ |
| 159 | $S_{16,12,158}$ | $S_{16,12,159}$ | $S_{16,13,158}$ | $S_{16,13,159}$ | $S_{16,14,158}$ | $S_{16,14,159}$ | $S_{16,15,158}$ | $S_{16,15,159}$ |

*FIG. 11*

DATA DEMODULATION FOR A CDMA COMMUNICATION SYSTEM

BACKGROUND

I. Field

The present invention relates generally to communication, and more specifically to techniques for performing data demodulation in a Code Division Multiple Access (CDMA) communication system.

II. Background

In a CDMA system, a base station transmits data on "code" channels to wireless terminals. Each code channel is associated with a respective orthogonal code. The base station channelizes data for a code channel by multiplying each data symbol to be transmitted on the code channel with all L chips of an L-chip orthogonal code assigned to the code channel to obtain L channelized data symbols, which are then transmitted. L is the spreading factor (SF) or length of the orthogonal code and is equal to four or greater (i.e., $L \geq 4$). A recipient terminal recovers the data sent on the code channel by first multiplying received samples with the L chips of the same orthogonal code to obtain de-patterned samples. The terminal then accumulates groups of L de-patterned samples for the entire orthogonal code to obtain recovered data symbols, which are estimates of the data symbols sent on the code channel by the base station.

The channelization achieves orthogonality among all of the code channels transmitted concurrently by the base station. For Wideband-CDMA (W-CDMA), the channelization is referred to as "spreading", the code channels are referred to as "physical" channels, and orthogonal variable spreading factor (OVSF) codes are used for the orthogonal codes. For IS-95 and IS-2000, the channelization is referred to as "covering", the code channels are referred to as "traffic" channels, and Walsh codes and quasi-orthogonal functions (QOF) are used for the orthogonal codes. Thus, different CDMA standards may use different terminology for the channelization process. For clarity, W-CDMA terminology is used for the following description.

A base station may transmit data on multiple physical channels to a single terminal in order to achieve a higher data rate. The base station may also perform other processing on the data symbols prior to transmission to the terminal. For example, the base station may utilize space time transmit diversity (STTD) and transmit the data symbols from multiple antennas to obtain spatial diversity, which can combat deleterious path effects. The terminal performs data demodulation to recover the data symbols sent on the multiple physical channels. As part of the data demodulation, the terminal typically performs despreading for each physical channel to obtain despread symbols for that physical channel. The terminal then performs other processing (e.g., channel compensation and STTD decoding) on the despread symbols for each physical channel to obtain recovered data symbols for the physical channel. The processing for data demodulation greatly increases as the number of physical channels increases.

There is therefore a need in the art for techniques to more efficiently perform data demodulation in a CDMA system.

SUMMARY

Techniques for performing data demodulation on partially despread symbols are provided herein. A partially despread symbol for a physical channel with a spreading factor of L is obtained by accumulating de-patterned samples over a length shorter than L (e.g., accumulating over L/2 or L/4). Data demodulation on partially despread symbols reduces the number of required multiplications.

In one embodiment, an integrated circuit operable to perform data demodulation on partially despread symbols includes a despreading unit, a channel compensation unit, and a symbol combiner. The despreading unit despreads input samples and provides despread symbols for a first code channel with a first spreading factor (e.g., SF=8). The channel compensation unit multiplies the despread symbols with channel estimates and provides demodulated symbols. The symbol combiner combines groups of demodulated symbols to obtain recovered data symbols for a second code channel with a second spreading factor (e.g., SF=16) that is an integer multiple of the first spreading factor. The channel compensation and symbol combining are dependent on whether or not STTD is used, as described below.

For a time division multiplex (TDM) design, despread symbols for multiple first code channels may be processed in a TDM manner to obtain recovered data symbols for multiple second code channels. A channel selector receives the despread symbols for the multiple first code channels and provides one despread symbol for one first code channel at a time to the channel compensation unit. The channel compensation unit and symbol combiner are operated in a pipelined manner. The channel compensation unit multiplies the despread symbols from the channel selector with the channel estimates and provides the demodulated symbols. The symbol combiner combines the demodulated symbols from the channel compensation unit with accumulated symbols and provides combined symbols. The accumulated symbols are indicative of partial combining results for the recovered data symbols, and the combined symbols are indicative of updated combining results for the recovered data symbols. A symbol buffer provides the accumulated symbols and stores the combined symbols.

The techniques described herein may be used for various CDMA systems and standards. For example, the second code channel may be a high-speed physical downlink shared channel (HS-PDSCH) in W-CDMA, a packet data channel (PDCH) in IS-2000, and so on.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 11 shows a symbol buffer within the DDE unit; and

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

W-CDMA Release 5 supports high-speed downlink packet access (HSDPA), which is a set of channels and procedures that enables high-speed packet data transmission on the downlink. For HSDPA, data is processed in blocks that are multiplexed onto a high-speed downlink shared channel (HS-DSCH). The HS-DSCH is then mapped to one or more high-speed physical downlink shared channels (HS-PDSCHs), which are physical channels. A physical channel is associated with an OVSF code and other attributes (e.g., power control). The HS-PDSCHs may be used to transmit data in a time and code division multiplexed (TDMICDM) manner for multiple terminals. The control information for the HS-PDSCHs is transmitted on one or more HS-SCCHs, which are shared control physical channels for the HS-DSCH. The control information includes various parameters used by the terminals to properly receive and process the HS-PDSCHs.

Figure 1:
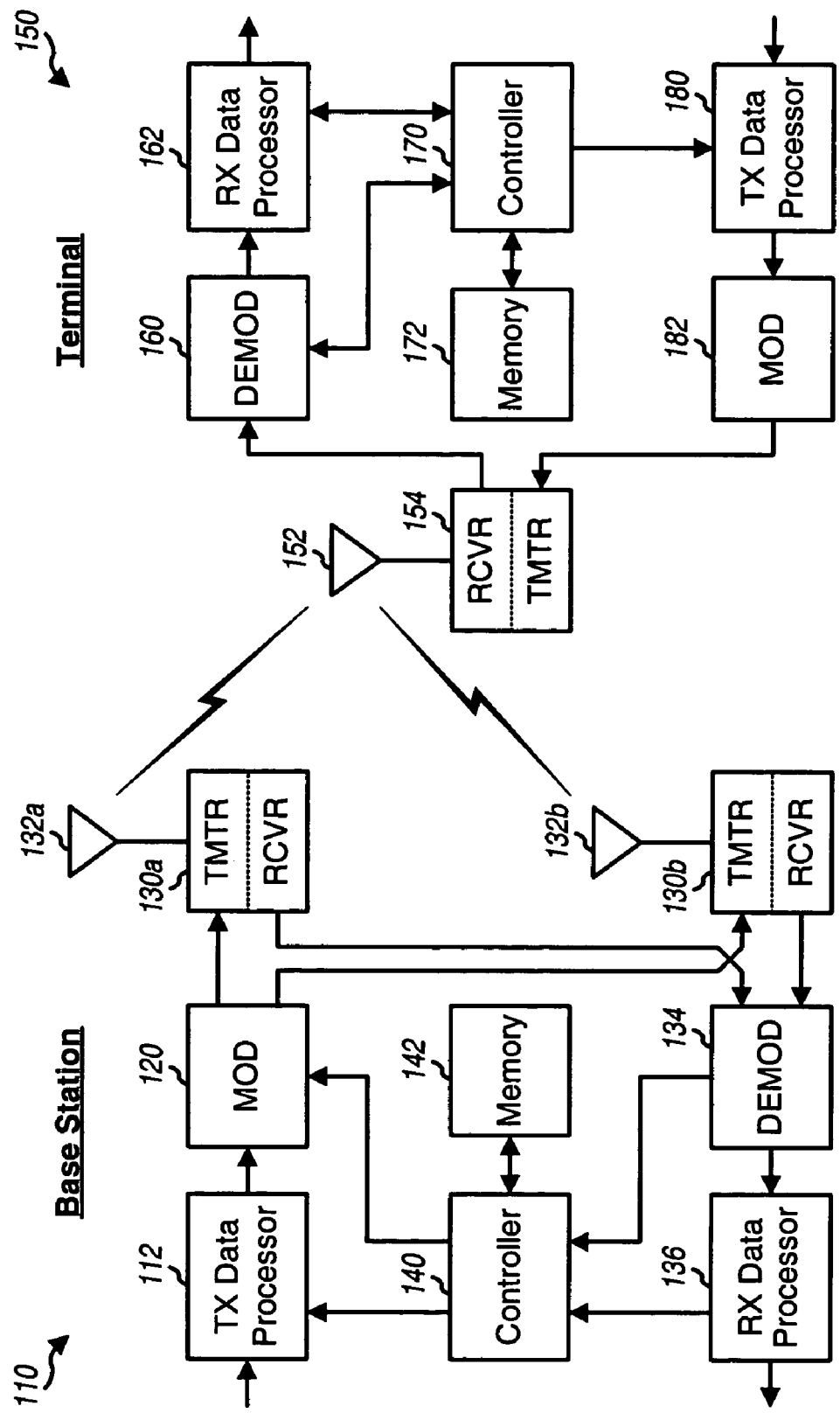
FIG. 1 shows a base station and a wireless terminal in a W-CDMA system.

FIG. 1 shows a block diagram of a base station 110 and a wireless terminal 150 in a W-CDMA system. A base station is referred to as a Node B and a terminal is referred to as a user equipment (UE) in W-CDMA terminology. Terminal 150 may communicate with one or more base stations on the downlink (i.e., the communication link from the base station to the terminal) and/or the uplink (i.e., the communication link from the terminal to the base station) at any given moment.

On the downlink, a transmit (TX) data processor 112 receives and processes (e.g., formats, encodes, and interleaves) data for transport channels, maps the processed data onto physical channels, and provides data symbols for each physical channel. A modulator (MOD) 120 further processes (e.g., channelizes, spectrally spreads, and scales) the data symbols from TX data processor 112 and provides one output chip stream for each antenna used for data transmission. Each output chip stream is conditioned (e.g., converted to analog, amplified, filtered, and frequency upconverted) by a respective transmitter unit (TMTR) 130 to generate a downlink modulated signal, which is then transmitted from a respective antenna 132.

At terminal 150, the downlink modulated signal(s) are received by an antenna 152 and provided to a receiver unit (RCVR) 154. Receiver unit 154 conditions (e.g., frequency downconverts, filters, and amplifies) the received signal from antenna 152 and digitizes the conditioned signal to obtain received samples. A demodulator (DEMOD) 160 further processes (e.g., descrambles, despreads, and demodulates) the received samples to obtain recovered data symbols, which are estimates of the data symbols transmitted by base station 110. An RX data processor 162 further processes (e.g., deinterleaves and decodes) the recovered data symbols to obtain decoded data.

On the uplink, a TX data processor 180 receives and processes various types of data (e.g., acknowledgments for the downlink packet data transmission). The processed data from TX data processor 180 is further processed (e.g., spread and scrambled) by a modulator 182 and conditioned by a transmitter unit 154 to generate an uplink modulated signal, which is then transmitted via antenna 152. At base station 110, the uplink modulated signal is received by antennas 132a and 132b and conditioned and digitized by receiver units 130a and 130b to provide samples. A demodulator 134 and an RX data processor 136 further process the samples to recover the data transmitted by terminal 150.

Controllers 140 and 170 direct the operation of various processing units within base station 110 and terminal 150, respectively. Memory units 142 and 172 store data and program codes used by various processing units within base station 110 and terminal 150, respectively.

Figure 2:
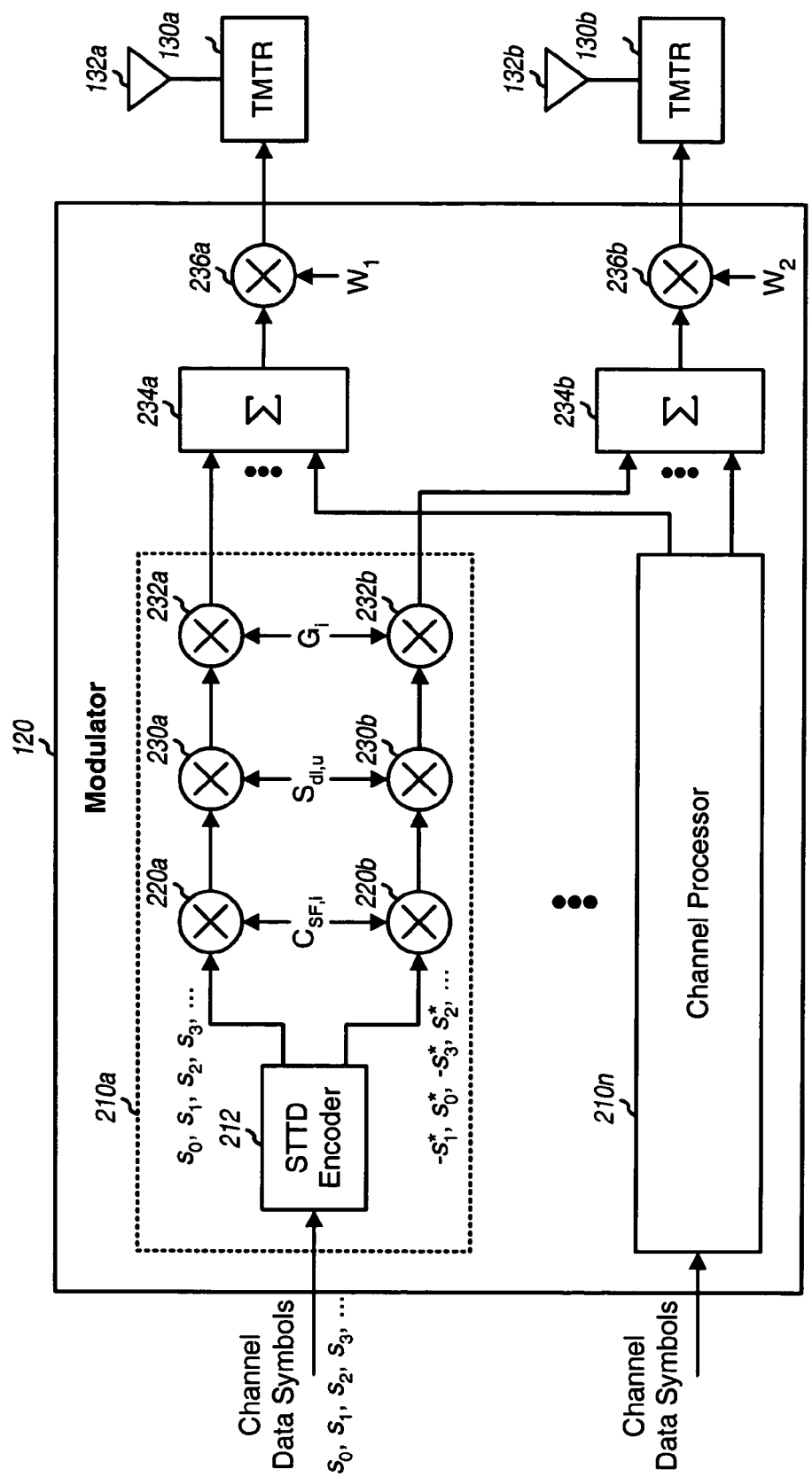
FIG. 2 shows a modulator within the base station.

FIG. 2 shows a block diagram of modulator 120 within base station 110 in FIG. 1. The base station typically uses multiple physical channels to transmit data to one or multiple terminals at any given moment. Modulator 120 includes N channel processors 210a through 210n, one channel processor for each physical channel used for data transmission. Within channel processor 210 for physical channel $Ch_{SF_j,i}$ an STTD encoder 212 receives the data symbols for the physical channel. For non-STTD mode (i.e., with STTD not enabled), STTD encoder 212 provides the same data symbols to both multipliers 220a and 220b. For STTD mode (i.e., with STTD enabled), as shown in FIG. 2, STTD encoder 212 provides STTD encoded symbols for antenna 1 to multiplier 220a and STTD encoded symbols for antenna 2 to multiplier 220b. STTD is selectable by base station 110.

For each antenna, multiplier 220 multiplies the STTD encoded symbols for that antenna with an OVSF code $C_{SF,i}$ assigned to channel $Ch_{SF,i}$ and provides channelized symbols. Multiplier 220 performs spreading for channel $Ch_{SF,i}$. The symbol rate into multiplier 220 is $1/T_S$ and the symbol rate from multiplier 220 is $SF/T_S$, where $T_S$ is one data symbol period. Each physical channel is assigned a different OVSF code, but the same OVSF code is used for both antennas for the physical channel. The channelized symbols for each antenna are then scrambled (i.e., multiplied) with a complex-valued scrambling code $S_{dl,u}$ by a multiplier 230 and further scaled with a weight factor $G_i$ by a multiplier 232. The scrambling code $S_{dl,u}$ is assigned to the terminal for which channel $Ch_{SF,i}$ is directed. The weight factor $G_i$ determines the amount of the transmit power used for channel $Ch_{SF,i}$. Multiplier 232a provides scrambled and weighted symbols for antenna 1 to a combiner 234a, and multiplier 232b provides scrambled and weighted symbols for antenna 2 to a combiner 234b.

Combiner 234a receives and combines the scrambled and weighted data for channel $Ch_{SF,i}$ with data for other physical channels for antenna 1 and provides composite symbols for antenna 1. A multiplier 236a multiplies the composite symbols with a complex-valued weight factor $W_1$ and provides weighted symbols for antenna 1. Combiner 234b and multiplier 236b perform similar processing for antenna 2. The weight factors $W_1$ and $W_2$ are used for phase adjustment in closed loop mode 1 in W-CDMA and for phase and amplitude adjustment in closed loop mode 2. Closed loop modes 1 and 2 only apply to the DPCH and the corresponding PDSCH. When a closed loop mode is enabled, data is not STFD encoded and multipliers 236a and 236b are provided with the appropriate weight factors $W_1$ and $W_2$. When a closed loop mode is not enabled, the multiplier 236a and 236b are bypassed by setting both weight factors $W_1$ and $W_2$ to one. Multipliers 236a and 236b provide weighted symbols (i.e., output chip streams) for antennas 1 and 2 to transmitter units 130a and 130b, respectively, where the weighting may be with unity or non-unity weight factors $W_1$ and $W_2$.

Figure 3:
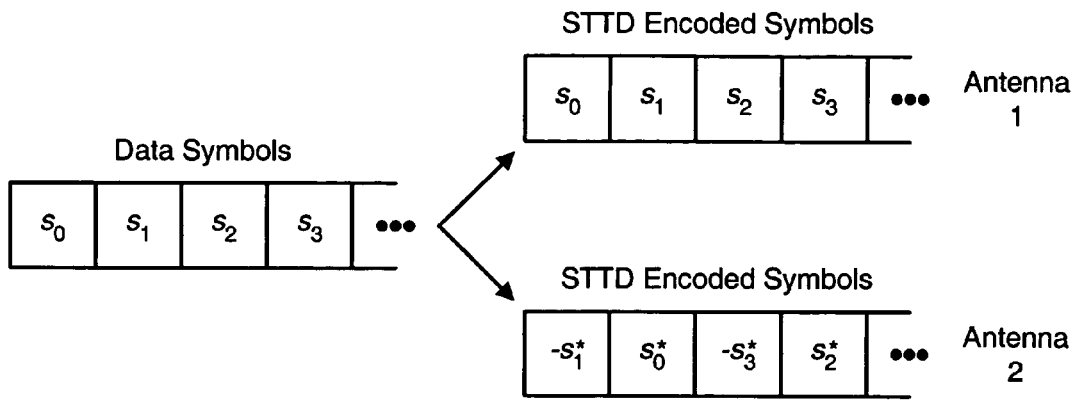
FIG. 3 illustrates STTD encoding in W-CDMA.

FIG. 3 illustrates STTD encoding in W-CDMA. The data for each physical channel is a sequence of bits which can be expressed as $\{b_0, b_1, b_2, b_3, b_4, b_5, b_6, b_7, \ldots\}$. STTD encoder 212 receives the input bit sequence and provides two output bit sequences for the two antennas. The output bit sequence for antenna 1 is the same as the input bit sequence. The output bit sequence for antenna 2 is $\{-b_2, b_3, b_0, -b_1, -b_6, b_7, b_4, -b_5, \ldots\}$. The output bit sequence for each antenna is demultiplexed into an inphase (I) sequence and a quadrature (Q) sequence. The I sequence for antenna 1 is $\{b_0, b_2, b_4, b_6, \ldots\}$ and the Q sequence for antenna 1 is $\{b_1, b_3, b_5, b_7, \ldots\}$. The I and Q sequences for antenna 1 can be viewed as a complex-valued symbol sequence $\{s_0, s_1, s_2, s_3, \ldots\}$, where $s_0 = b_0 + jb_1$, $s_1 = b_2 + jb_3$, and so on. Similarly, the I sequence for antenna 2 is $\{-b_2, b_0, -b_6, b_4, \ldots\}$ and the Q sequence for antenna 2 is $\{b_3, -b_1, b_7, -b_5, \ldots\}$. The I and Q sequences for antenna 2 can be viewed as a complex-valued symbol sequence $\{-s^*_1, s^*_0, -s^*_3, s^*_2, \ldots\}$, where $-s^*_1 = -b_2 + jb_3$, $s^*_0 = b_0 - jb_1$, and so on, where $s^*_0$ is the complex conjugate of $s_0$. The STTD encoding effectively transmits each pair of data symbols (e.g., $s_0$ and $s_1$) over two antennas to achieve spatial diversity, which can combat deleterious path effects. Moreover, the data symbols for antenna 2 are rearranged to provide temporal diversity.

Figure 4:
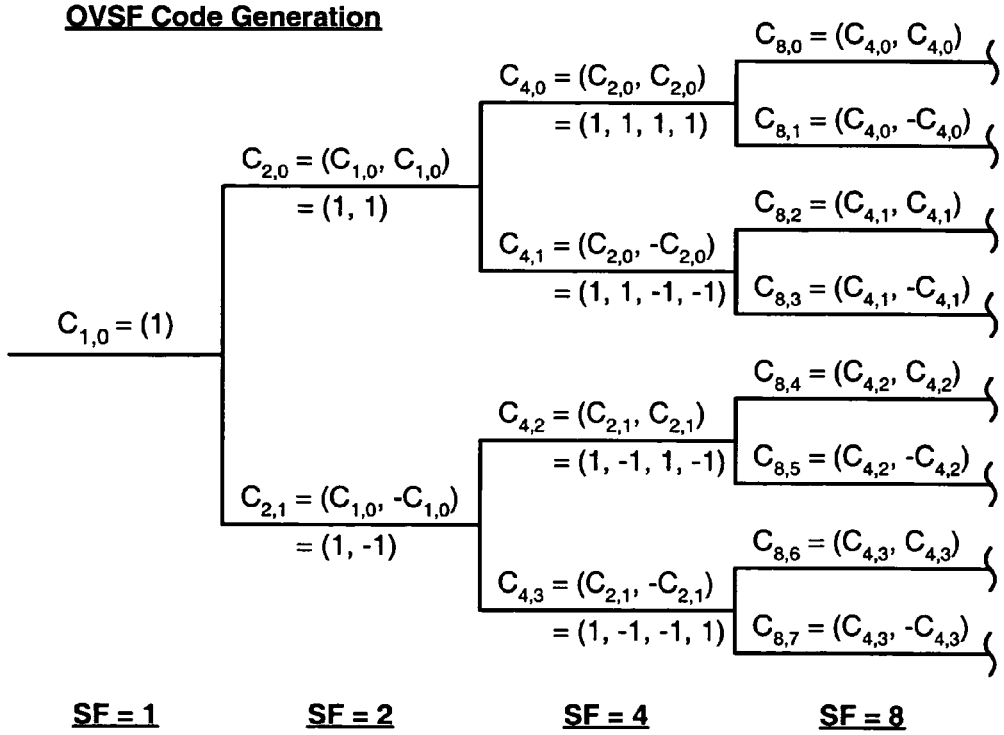
FIG. 4 shows the generation of OVSF codes used in W-CDMA.

FIG. 4 shows the generation of the OVSF codes used in W-CDMA. Each OVSF code is identified by a designation $C_{SF,i}$, where the subscript "SF" denotes the spreading factor of the OVSF code and i denotes the code number. The spreading factor is the length of the OVSF code and is given in number of chips. The code number i ranges from 0 through SF-1, i.e., $i=0, 1, \ldots, SF-1$. OVSF codes are structured codes, and successively longer OVSF codes can be generated from shorter OVSF codes in accordance with defined rules. OVSF codes of length 2L can be generated by forming two longer OVSF codes with each shorter OVSF code of length L. The first longer OVSF code is formed by repeating the shorter OVSF code twice, i.e., $Ch_{2L,2i} = (Ch_{L,i}, Ch_{L,i})$. The second longer OVSF code is formed by repeating the shorter OVSF code twice and inverting the second repetition, i.e., $Ch_{2L,2i+1} = (Ch_{L,i}, -Ch_{L,i})$. The structured nature of the OVSF codes can be exploited to simplify the data demodulation, as described below.

For HSDPA, a base station may transmit up to five HS-PDSCHs to a given terminal at any given moment. The HS-PDSCHs are shared among all terminals under the coverage of the base station. Each HS-PDSCH is assigned a specific OVSF code with a spreading factor of 16 (SF=16). The base station also transmits up to four HS-SCCHS, with each HS-SCCH being assigned a specific OVSF code with a spreading factor of 128. The HS-PDSCHs and HS-SCCHs for HSDPA are described by W-CDMA Release 5 standard, which is publicly available.

The HS-SCCHs carry control information for the HS-PDSCHs. The control information indicates the OVSF code, modulation scheme, and recipient terminal for each HS-PDSCH. The base station sends the control information on the HS-SCCHs two slots ahead of the corresponding packet transmissions on the HS-PDSCHs. A terminal receives control information from only one HS-SCCH, if at all, but may receive packet data from one or multiple HS-PDSCHs.

Figure 5:
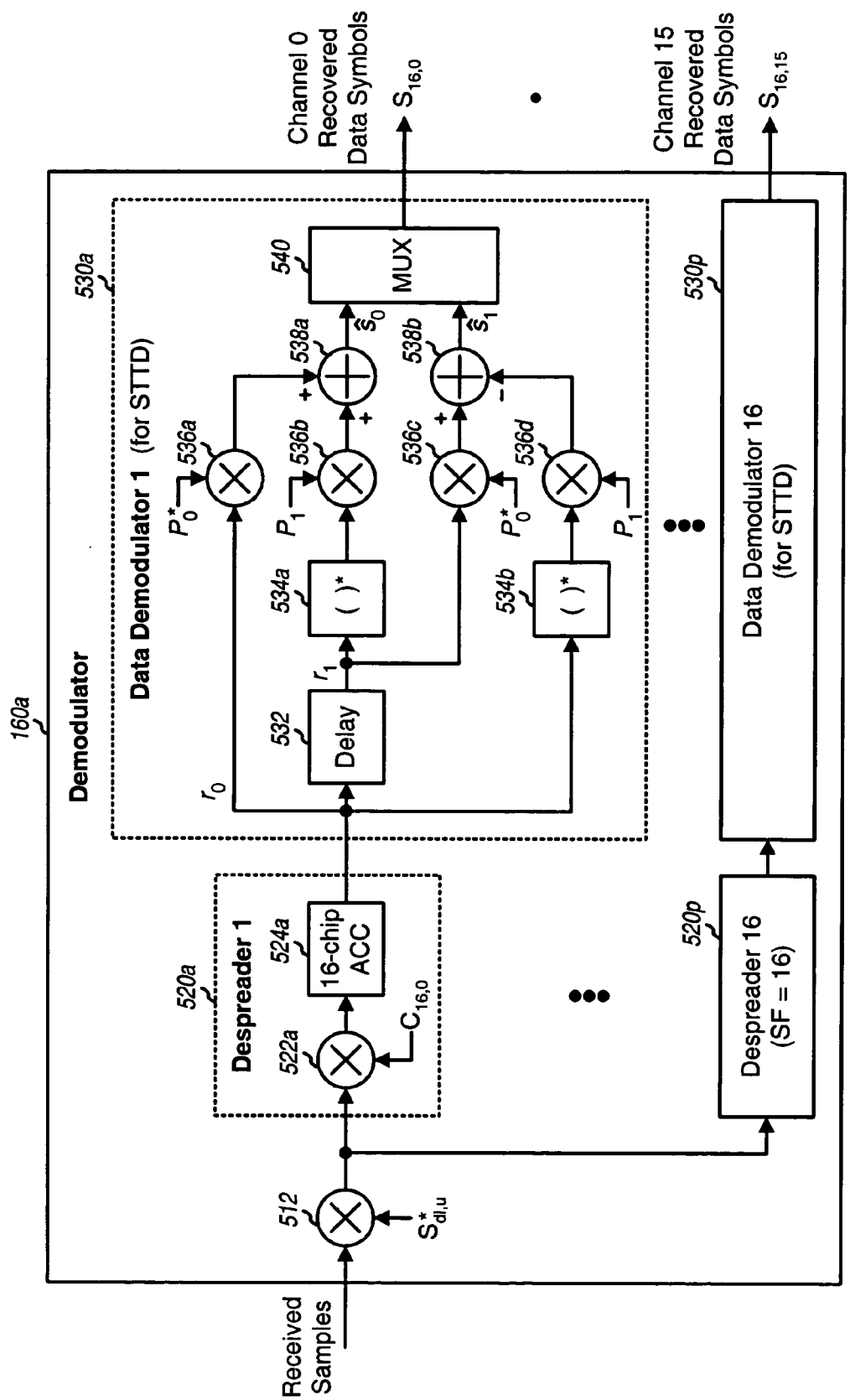
FIG. 5 shows a demodulator that performs data demodulation on fully despread symbols.

FIG. 5 shows a block diagram of a demodulator 160a that performs data demodulation on fully despread symbols for the HS-PDSCHs. Demodulator 160a is one implementation of demodulator 160 in FIG. 1.

Within demodulator 160a, a multiplier 512 multiplies the received samples from receiver unit 154 with a descrambling code $S^*_{dl,u}$ assigned to terminal 150 and provides descrambled samples. For HSDPA, the descrambled samples are provided to sixteen SF=16 despreaders 520a through 520p, one despreader 520 for each of the sixteen SF=16 channels $Ch_{16,0}$ to $Ch_{16,15}$ that may be used for the HS-PDSCHs by base station 110. Within despreader 520 for channel $Ch_{16,i}$ a multiplier 522 multiplies the descrambled samples with the OVSF code $C_{16,i}$ for channel $Ch_{16,i}$. An accumulator 524 then accumulates the output of multiplier 522 over the length of the OVSF code $C_{16,i}$ (which is 16 chips for SF=16) and provides despread symbols for channel $Ch_{16,i}$. Multiplier 522 and accumulator 524 perform despreading for channel $Ch_{16,i}$.

For the non-STID mode, the data symbols for each physical channel are transmitted from one base station antenna. The received symbols at the terminal may be expressed as:

$$r = h \cdot s + n, \quad \text{Eq (1)}$$

where s is the data symbol transmitted by the base station;

r is the symbol received by the terminal;

h is the signal path gain from the base station antenna to the terminal antenna; and n is the noise associated with the received symbol r.

The terminal may derive an estimate, $\hat{s}$, of the transmitted data symbol s, as follows:

$$\hat{s} = \frac{h^* \cdot r}{|h|^2} = s + \frac{h^* \cdot n}{|h|^2}. \quad \text{Eq (2)}$$

The processing in equation (2) is referred to as data demodulation or matched filtering.

For the STTD mode, the terminal performs the complementary STTD decoding to recover the transmitted data symbols. For STTD transmission of a pair of data symbols, $s_0$ and $s_1$, the base station transmits $s_0$ and $s_1$ sequentially in two data symbol periods from antenna 1 and transmits $-s^*_1$ and $s^*_0$ sequentially in the same 2-symbol period from antenna 2, as shown in FIG. 3. If the terminal is equipped with a single antenna, then the received symbols may be expressed as:

$$r_0 = h_0 s_0 - h_1 s^*_1 + n_0, \text{ and}$$

$$r_1 = h_0 s_1 + h_1 s^*_0 + n_1, \quad \text{Eq (3)}$$

where $r_0$ and $r_1$ are two symbols received by the terminal in two symbol periods;

$h_0$ and $h_1$ are the signal path gains from base station antennas 1 and 2 to the terminal antenna for the 2-symbol period; and $n_0$ and $n_1$ are the noise associated with the two received symbols $r_0$ and $r_1$, respectively.

The terminal may derive estimates of the two transmitted symbols, $s_0$ and $s_1$, as follows:

$$\hat{s}_0 = \frac{h_0^* \cdot r_0 + h_1 \cdot r_1^*}{|h_0|^2 + |h_1|^2} = s_0 + \frac{h_0^* \cdot n_0 + h_1 \cdot n_1}{|h_0|^2 + |h_1|^2}, \text{ and} \quad \text{Eq (4)}$$

$$\hat{s}_1 = \frac{-h_1 \cdot r_0^* + h_0^* \cdot r_1}{|h_0|^2 + |h_1|^2} = s_1 + \frac{h_0^* \cdot n_1 - h_1 \cdot n_0}{|h_0|^2 + |h_1|^2}.$$

The processing in equation set (4) is referred to as data demodulation for STTD.

Demodulator 160a includes sixteen data demodulators 530a through 530p for the sixteen SF=16 channels. Each data demodulator 530 performs data demodulation for STTD for one SF=16 channel, as shown in equation set (4). Within data demodulator 530 for channel $Ch_{16,i}$, the despread symbols for channel $Ch_{16,j}$ (which correspond to $r_0$ in equation set (4)) are provided to a delay unit 532, a complex conjugate unit 534b, and a multiplier 536a. Delay unit 532 provides one SF=16 symbol period of delay and provides the delayed despread symbols (which correspond to $r_1$) to a complex conjugate unit 534a and a multiplier 536c. Multiplier 536a multiplies the despread symbols with a channel estimate $P^*_0$ (which corresponds to $h^*_0$) and provides demodulated symbols corresponding to the term $h^*_0 \cdot r_0$. Multiplier 536b multiplies the conjugated and delayed despread symbols with a channel estimate $P_1$ (which corresponds to $h_1$) and provides demodulated symbols corresponding to the term $h_1 \cdot r^*_1$. Multiplier 536c multiplies the delayed despread symbols with the channel estimate $P^*_0$ and provides demodulated symbols corresponding to the term $h^*_0 \cdot r_1$. Multiplier 536d multiplies the conjugated despread symbols with the channel estimate $P_1$ and provides demodulated symbols corresponding to the term $h_1 \cdot r^*_0$. Channel estimates are typically obtained based on a pilot transmitted by the base station and are thus commonly referred to as pilot estimates.

A summer 538a adds the demodulated symbols from multipliers 536a and 536b to obtain recovered data symbols corresponding to $\hat{s}_0$. A summer 538b subtracts the demodulated symbols from multiplier 536d from the demodulated symbols from multiplier 536c to obtain recovered data symbols corresponding to $\hat{s}_1$. A multiplexer (MUX) 540 receives the recovered data symbols for $\hat{s}_0$ and $\hat{s}_1$ and provides serialized recovered data symbols for channel $Ch_{16,i}$ (denoted as $S_{16,i}$).

For the implementation shown in FIG. 5, sixteen multipliers 522a through 522p are used to obtain despread symbols for sixteen SF=16 channels $Ch_{16,0}$ to $Ch_{16,15}$. Four complex multipliers 536a through 536d are used for STTD channel compensation for each physical channel. A total of 64 complex multipliers are needed to process the sixteen channels $Ch_{16,0}$ to $Ch_{16,15}$ that may be used for the HS-PDSCHs.

A demodulator can be designed to exploit the structured nature of the OVSF codes and perform data demodulation on partially despread symbols for the HS-PDSCHs. A partially despread symbol for a physical channel with a spreading factor of L is obtained by accumulating over a length shorter than L (e.g., accumulating over L/2 or L/4). A partially despread symbol for the physical channel with a spreading factor of L is a fully despread symbol for another physical channel with a spreading factor smaller than L. Data demodulation on partially despread symbols reduces the number of required multiplications.

The data demodulation on partially despread symbols for the HS-PDSCHs may be performed in various manners. Two exemplary schemes are described below.

1. Multiply despread symbols for an SF=4 channel $Ch_{4,i}$ with channel estimates and combine SF=4 demodulated symbols to obtain recovered data symbols for four SF=16 channels $Ch_{16,4i}$ through $Ch_{16,4i+3}$.
2. Multiply despread symbol for an SF=8 channel $Ch_{8,i}$ with channel estimates and combine SF=8 demodulated symbols to obtain recovered data symbols for two SF=16 channels $Ch_{16,2i}$ and $Ch_{16,2i+1}$.

Scheme 2 requires less computation and fewer memory accesses. An exemplary design for scheme 2 is described below.

For the non-STID mode, the data demodulation for SF=16 channels with SF=8 despread symbols may be expressed as:

$$S_{16,2i,n} = P^* \cdot R_{16,2i,n} = P^* \cdot (R_{8,i,2n} + R_{8,i,2n+1}) = P^* \cdot R_{8,i,2n} + P^* \cdot R_{8,i,2n+1}$$

$$S_{16,2i+1,n} = P^* \cdot R_{16,2i+1,n} = P^* \cdot (R_{8,i,2n} - R_{8,i,2n+1}) = P^* \cdot R_{8,i,2n} - P^* \cdot R_{8,i,2n+1} \qquad \text{Eq (5)}$$

where

P is the channel estimate;

$R_{SF,i,n}$ is the despread symbol for channel $Ch_{SF,i}$ for symbol period n; and $S_{SF,i,n}$ is the recovered data symbol for channel $Ch_{SF,i}$ for symbol period n.

For the STTD mode, the data demodulation for SF=16 channels with SF=8 despread symbols may be expressed as:

$$\begin{aligned} S_{16,2i,n} &= P_0^* \cdot R_{16,2i,n} + P_1 \cdot R^*_{16,2i,n+1} \\ &= P_0^* \cdot (R_{8,i,2n} + R_{8,i,2n+1}) + P_1 \cdot (R_{8,i,2n+2} + R_{8,i,2n+3})^* \\ &= P_0^* \cdot R_{8,i,2n} + P_0^* \cdot R_{8,i,2n+1} + P_1 \cdot R^*_{8,i,2n+2} + P_1 \cdot R^*_{8,i,2n+3} \\ &= D^0_{8,i,2n} + D^0_{8,i,2n+1} + D^1_{8,i,2n+2} + D^1_{8,i,2n+3} \end{aligned} \qquad \text{Eq (6)}$$

$$\begin{aligned} S_{16,2i,n+1} &= -P_1 \cdot R^*_{16,2i,n} + P_0^* \cdot R_{16,2i,n+1} \\ &= -P_1 \cdot (R_{8,i,2n} + R_{8,i,2n+1})^* + P_0^* \cdot (R_{8,i,2n+2} + R_{8,i,2n+2}) \\ &= -P_1 \cdot R^*_{8,i,2n} - P_1 \cdot R^*_{8,i,2n+1} + P_0^* \cdot R_{8,i,2n+2} + P_0^* \cdot R_{8,i,2n+3} \\ &= -D^1_{8,i,2n} - D^1_{8,i,2n+1} + D^0_{8,i,2n+2} + D^0_{8,i,2n+3} \end{aligned} \qquad \text{Eq (7)}$$

$$\begin{aligned} S_{16,2i+1,n} &= P_0^* \cdot R_{16,2i+1,n} + P_1 \cdot R^*_{16,2i+1,n+1} \\ &= P_0^* \cdot (R_{8,i,2n} - R_{8,i,2n+1}) + P_1 \cdot (R_{8,i,2n+2} - R_{8,i,2n+3})^* \\ &= P_0^* \cdot R_{8,i,2n} - P_0^* \cdot R_{8,i,2n+1} + P_1 \cdot R^*_{8,i,2n+2} - P_1 \cdot R^*_{8,i,2n+3} \\ &= D^0_{8,i,2n} - D^0_{8,i,2n+1} + D^1_{8,i,2n+2} - D^1_{8,i,2n+3} \end{aligned} \qquad \text{Eq (8)}$$

-continued $$S_{16,2i+1,n+1} = -P_1 \cdot R^*_{16,2i+1,n} + P^*_0 \cdot R_{16,2i+1,n+1} \quad \text{Eq (9)}$$
$$= -P_1 \cdot (R_{8,i,2n} - R_{8,i,2n+1})^* + P^*_0 \cdot (R_{8,i,2n+2} - R_{8,i,2n+3})$$
$$= -P_1 \cdot R^*_{8,i,2n} + P_1 \cdot R^*_{8,i,2n+1} + P^*_0 \cdot R_{8,i,2n+2} - P^*_0 \cdot R_{8,i,2n+3}$$
$$= -D^1_{8,i,2n} + D^1_{8,i,2n+1} + D^0_{8,i,2n+2} - D^0_{8,i,2n+3},$$

where $P_0$ is the channel estimate for antenna 1;

$P_1$ is the channel estimate for antenna 2; and $D_{SF,i,n}^a$ is the demodulated symbol for channel $Ch_{SF,i}$ for symbol period n, which is obtained with channel estimate $P_a$.

In equations (6) through (9), $S_{16,2i,n}$ is an even recovered data symbol for an even SF=16 channel, $S_{16,2i,n+1}$ is an odd recovered data symbol for an even SF=16 channel, $S_{16,2i+1,n}$ is an even recovered data symbol for an odd SF=16 channel, and $S_{16,2i+1,n+1}$ is an odd recovered data symbol for an odd SF=16 channel. Even SF=16 channels have even-numbered indices 2i, and odd SF=16 channels have odd-numbered indices 2i+1. Even recovered data symbols have even-numbered SF=16 symbol period indices n, and odd recovered data symbols have odd-numbered symbol period indices n+1.

As shown in equations (6) through (9), for the STTD mode, four consecutive despread symbols $R_{8,i,2n}$ through $R_{8,i,2n+3}$ for one SF=8 channel $Ch_{8,i}$ are processed to obtain four recovered data symbols for two SF=16 channels $Ch_{16,2i}$ and $Ch_{16,2i+1}$ (i.e., one odd and one even recovered data symbol for each SF=16 channel). Each SF=8 despread symbol $R_{8,i,x}$ (where x=2n, 2n+1, 2n+2, or 2n+3) is multiplied with both $P^*_0$ and $P_1$ to obtain two demodulated symbols $D_{8,i,x}^0$ and $D_{8,i,x}^1$, respectively. Each demodulated symbol is used for two of the four recovered data symbols for channels $Ch_{16,2i}$ and $Ch_{16,2i+1}$. Each SF=8 despread symbol $R_{8,i,x}$ is thus used for all four recovered data symbols for channels $Ch_{16,2i}$ and $Ch_{16,2i+1}$.

Figure 6:
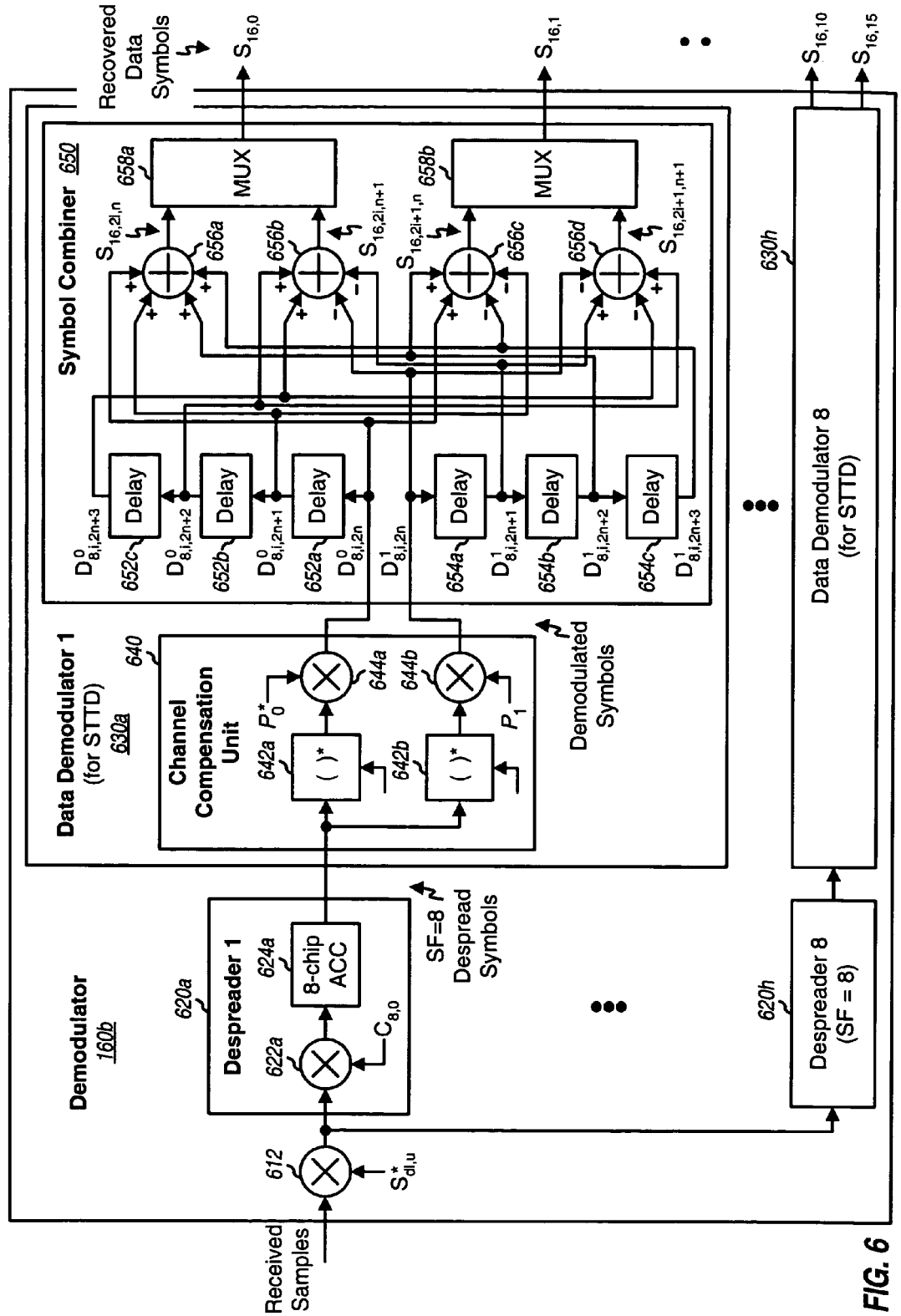
FIG. 6 shows a demodulator that performs data demodulation on partially despread symbols.

FIG. 6 shows a block diagram of a demodulator 160b that performs data demodulation on SF=8 despread symbols for the HS-PDSCHs. Demodulator 160b is an embodiment of demodulator 160 in FIG. 1. Within demodulator 160b, a multiplier 612 multiplies the received samples with the descrambling code $S^*_{dl,u}$ and provides descrambled samples to eight SF=8 despreaders 620a through 620h for eight SF=8 channels $Ch_{8,0}$ to $Ch_{8,7}$, respectively.

Within despreader 620 for channel $Ch_{8,i}$, a multiplier 622 multiplies the descrambled samples with the OVSF code $C_{8,i}$ for channel $Ch_{8,i}$. An accumulator 624 accumulates the output from multiplier 622 over the length of the OVSF code $C_{8,i}$ (i.e., over 8 chips) and provides despread symbols for channel $Ch_{8,i}$. Despreaders 620a through 620h provide despread symbols for eight channels $Ch_{8,0}$ to $Ch_{8,7}$ to data demodulators 630a through 630h, respectively.

Each data demodulator 630 includes a channel compensation unit 640 and a symbol combiner 650. Within data demodulator 630 for channel $Ch_{8,i}$ the despread symbols for channel $Ch_{8,i}$ are provided to units 642a and 642b within channel compensation unit 640. Each unit 642 provides either the received despread symbols or the complex conjugated despread symbols, as indicated by equations (6) through (9), to an associated multiplier 644. Multiplier 644a multiplies the output from unit 642a with the channel estimate $P^*_0$ and provides demodulated symbols $D_{8,i,2n}^0$ to a delay unit 652a within symbol combiner 650. Delay units 652a, 652b, and 652c are coupled in series and provide delayed demodulated symbols $D_{8,i,2n+1}^0$, $D_{8,i,2n+2}^0$, and $D_{8,i,2n+3}^0$, respectively. Similarly, multiplier 644b multiplies the output from unit 642b with the channel estimate $P_1$ and provides demodulated symbols $D_{8,i,2n}^1$ to a delay unit 654a. Delay units 654a, 654b, and 654c are coupled in series and provide delayed demodulated symbols $D_{8,i,2n+1}^1$, $D_{8,i,2n+2}^1$, and $D_{8,i,2n+3}^1$, respectively.

A summer 656a sums the demodulated symbols $D_{8,i,2n}^0$, $D_{8,i,2n+1}^0$, $D_{8,i,2n+2}^1$, and $D_{8,i,2n+3}^1$, as shown in equation (6), and provides the recovered data symbol $S_{16,2i,n}$. A summer 656b sums the demodulated symbols $D_{8,i,2n+2}^0$ and $D_{8,i,2n+3}^0$ and subtracts the demodulated symbols $D_{8,i,2n}^1$ and $D_{8,i,2n+1}^1$, as shown in equation (7), and provides the recovered data symbol $S_{16,2i,n+1}$. A multiplexer 658a receives the recovered data symbols $S_{16,2i,n}$ and $S_{16,2i,n+1}$ and provides serialized recovered data symbols for channel $Ch_{16,2i}$. A summer 656c sums the demodulated symbols $D_{8,i,2n}^0$ and $D_{8,i,2n+2}^1$ and subtracts the demodulated symbols $D_{8,i,2n+1}^0$ and $D_{8,i,2n+3}^1$, as shown in equation (8), and provides the recovered data symbol $S_{16,2i+1,n}$. A summer 656d sums the demodulated symbols $D_{8,i,2n+1}^1$ and $D_{8,i,2n+2}^0$ and subtracts the demodulated symbols $D_{8,i,2n}^1$ and $D_{8,i,2n+3}^1$ I as shown in equation (9), and provides the recovered data symbol $S_{16,2i+1,n+1}$. A multiplexer 658b receives the recovered data symbols $S_{16,2i+1,n}$ and $S_{16,2i+1,n+1}$ and provides serialized recovered data symbols for channel $Ch_{16,2i+1}$.

For the embodiment shown in FIG. 6, the data demodulation with SF=8 despread symbols requires only two complex multipliers 644a and 644b for each pair of SF=16 channels, or a total of sixteen complex multipliers for all sixteen SF=16 channels. This is one quarter the number of complex multipliers required for the implementation shown in FIG. 5.

The hardware for the demodulator may further be reduced with a TDM design. For the TDM design, one data demodulation engine (DDE) unit is used to perform the processing for all eight SF=8 channels in a TDM manner to obtain recovered data symbols for all sixteen SF=16 channels. In one embodiment, the DDE unit cycles through the eight SF=8 channels in eight clock cycles. For each SF=8 channel, the DDE unit computes two demodulated symbols for the despread symbol for that SF=8 channel and accumulates these demodulated symbols with partial combining results for four recovered data symbols for two SF=16 channels corresponding to the SF=8 channel. A symbol buffer is used to store the results of the combining.

Figure 7:
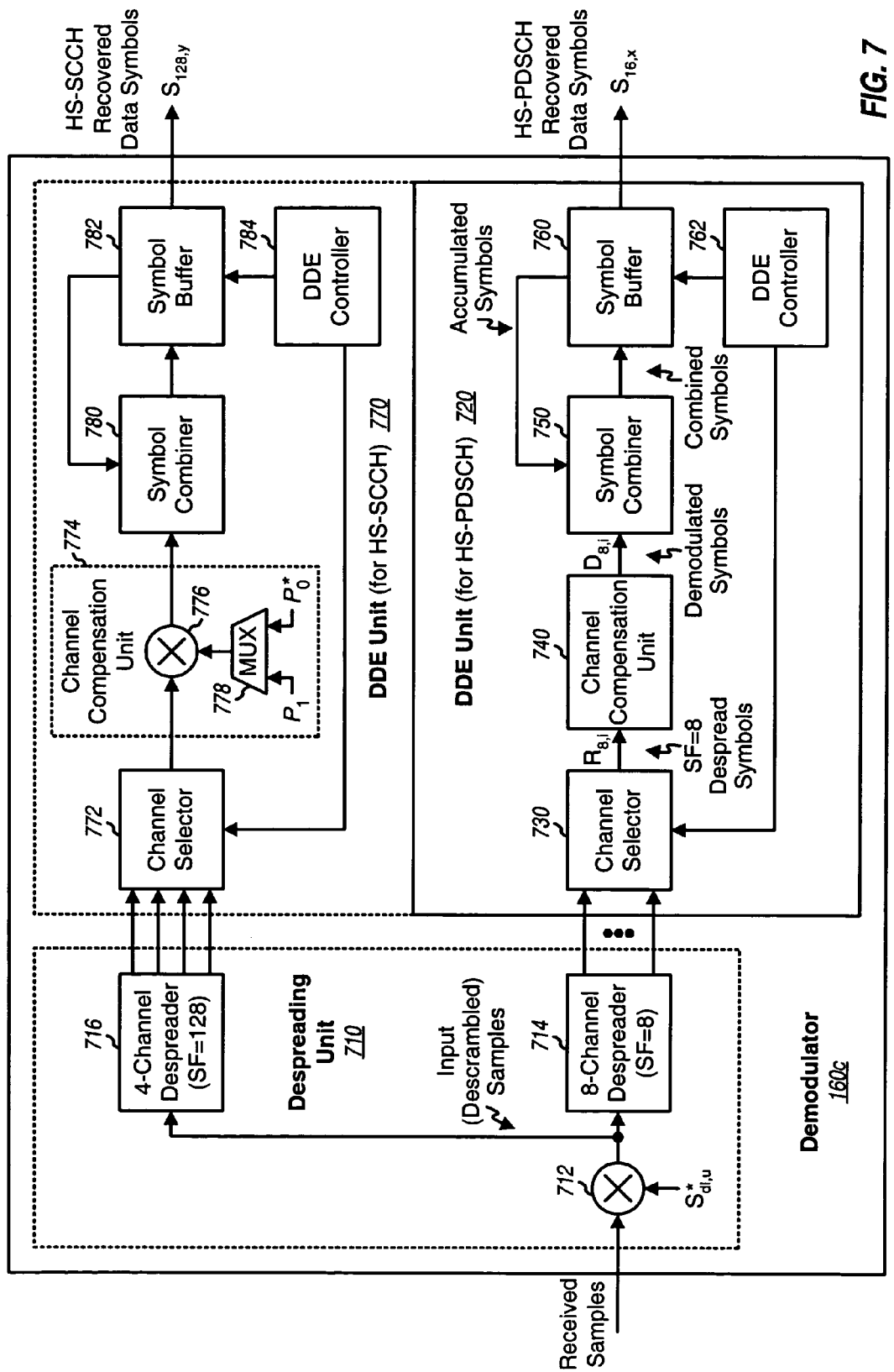
FIG. 7 shows a demodulator that performs data demodulation on partially despread symbols in a TDM manner.

FIG. 7 shows a block diagram of a demodulator 160c that performs data demodulation on SF=8 despread symbols for the HS-PDSCHs in a TDM manner. Demodulator 160c is another embodiment of demodulator 160 in FIG. 1. Demodulator 160c includes a despreading unit 710, a DDE unit 720 for the HS-PDSCHs, and a DDE unit 770 for the HS-SCCHs. Demodulator 160c may also include other processing units (e.g., for other physical channels), which are not shown in FIG. 7 for simplicity.

Within despreading unit 710, a multiplier 712 multiplies the received samples with the descrambling code $S^*_{dl,u}$ and provides descrambled samples. An 8-channel despreader 714 performs despreading on the descrambled samples for eight SF=8 channels $Ch_{8,0}$ to $Ch_{8,7}$ and provides despread symbols for these eight channels. A despreader 716 performs despreading on the descrambled samples for all four HS-SCCHs and provides despread symbols for these four channels.

Within DDE unit 720, a channel selector 730 receives from despreader 714 the despread symbols for the eight SF=8 channels $Ch_{8,0}$ to $Ch_{8,7}$ and provides one despread symbol for one channel at a time to a channel compensation unit 740. Channel compensation unit 740 multiplies the despread symbol $R_{8,i}$ for channel $Ch_{8,i}$ with the channel estimate $P^*_0$ for antenna 1 and the channel estimate $P_1$ for antenna 2 and provides demodulated symbols $D_{8,i}^0$ and $D_{8,i}^1$ to a symbol combiner 750.

Symbol combiner 750 combines all of the demodulated symbols for each recovered data symbol. The combining is performed piecewise as the demodulated symbols for each SF=8 despread symbol are obtained. The combining is further dependent on whether or not the base station utilizes STTD, as described below. A symbol buffer 760 provides accumulated symbols, which are intermediate results of the combining, to symbol combiner 750. Symbol combiner 750 combines the accumulated symbols with the current demodulated symbols and provides combined symbols, which are updated results of the combining. Symbol buffer 760 stores the combined symbols from symbol combiner 750, which become recovered data symbols after all demodulated symbols have been combined. A DDE controller 762 provides controls for channel selector 730, channel compensation unit 740, symbol combiner 750, and symbol buffer 760.

Within DDE unit 770, a channel selector 772 receives from despreader 716 the despread symbols for the four SF=128 channels used for the HS-SCCHs and provides the despread symbol for one channel at a time to a channel compensation unit 774. Within channel compensation unit 774, a multiplexer 778 receives the channel estimates $P_0$ and $P_1$ and provides channel estimate for the proper antenna to a multiplier 776. Multiplier 776 performs complex multiply of the despread symbol from channel selector 772 with the channel estimate from multiplexer 776 and provides the demodulated symbol to a symbol combiner 780. Symbol combiner 780 combines all of the demodulated symbols for each recovered data symbol for the HS-SCCHs. A symbol buffer 782 provides accumulated symbols to symbol combiner 780 for combining with the current demodulated symbols and stores the combined symbols from symbol combiner 780. A DDE controller 784 provides controls for channel selector 772, channel compensation unit 774, symbol combiner 780, and symbol buffer 782.

Figure 8:
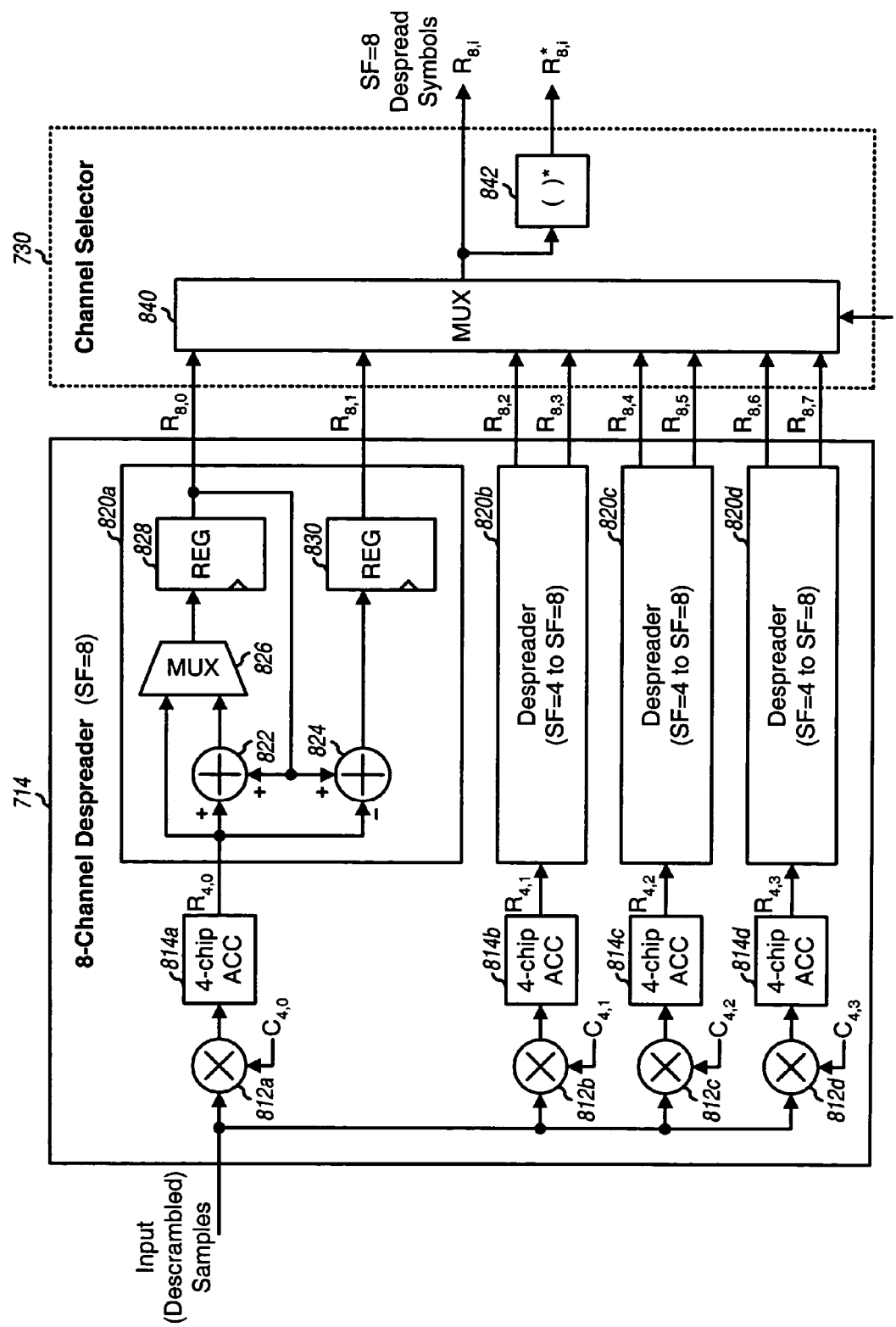
FIG. 8 shows an 8-channel despreader.

FIG. 8 shows a block diagram of 8-channel despreader 714 within demodulator 160c. The input samples (i.e., the descrambled samples) are provided to four multipliers 812a through 812d for four SF=4 channels $Ch_{4,0}$ through $Ch_{4,3}$, respectively. Each multiplier 812 multiplies the descrambled samples with a respective OVSF code $C_{4,i}$ for channel $Ch_{4,i}$ and provides de-patterned samples. An accumulator 814 accumulates each group of four de-patterned samples for the four chips of the OVSF code $C_{4,i}$ to obtain a despread symbol for channel $Ch_{4,i}$. Accumulators 814a through 814d provide despread symbols for SF=4 channels $Ch_{4,0}$ through $Ch_{4,3}$, respectively.

Four despreaders 820a through 820d receive the despread symbols for channels $Ch_{4,0}$ through $Ch_{4,3}$, respectively. Within despreader 820 for channel $Ch_{4,i}$, the despread symbols for this channel are provided to summers 822 and 824 and a multiplexer 826. For each pair of SF=4 despread symbols, the first symbol in the pair is passed through multiplexer 826 and stored in a register 828. When the second despread symbol in the pair is received, summer 822 sums the first and second symbols in the pair to obtain a despread symbol for SF=8 channel $Ch_{8,2i}$. A summer 824 subtracts the second symbol in the pair from the first symbol to obtain a despread symbol for SF=8 channel $Ch_{8,2i+1}$. The despread symbol for channel $Ch_{8,2i}$ is routed through multiplexer 826 and stored in register 828, and the despread symbol for channel $Ch_{8,2i+1}$ is stored in a register 830. Each despreader 820 provides despread symbols for a pair of SF=8 channels $Ch_{8,2i}$ and $Ch_{8,2i+1}$. Within channel selector 730, a multiplexer 840 receives the despread symbols for all eight SF=8 channels $Ch_{8,0}$ and $Ch_{8,7}$ from despreader 820a through 820d. Multiplexer 840 provides the despread symbol $R_{8,i}$ for one SF=8 channel at a time based on a control signal from DDE controller 762. A unit 842 receives the despread symbol from multiplexer 840 and provides the conjugated despread symbol $R^*_{8,i}$. Demodulator 160c can performed data demodulation on partially despread symbols for both the non-STTD mode and the STTD mode. Data demodulation for the STTD mode is described below.

Figure 9:
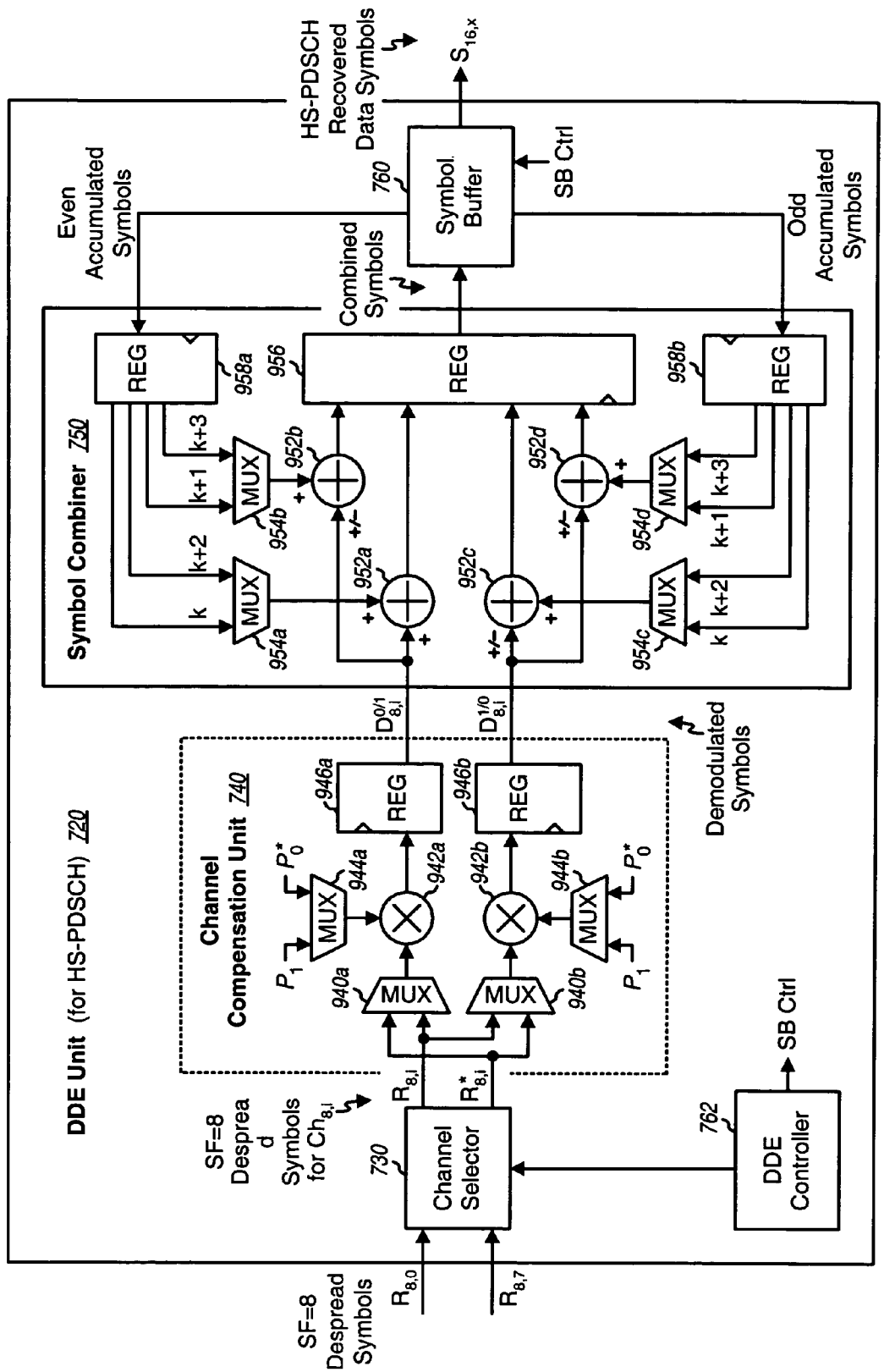
FIG. 9 shows a data demodulation engine (DDE) unit.

FIG. 9 shows a block diagram of DDE unit 720 for the HS-PDSCHs. DDE unit 720 is operated in a pipelined manner and processes one despread symbol for one SF=8 channel in each clock cycle. Channel selector 730 receives the despread symbols for eight SF=8 channels $Ch_{8,0}$ through $Ch_{8,7}$ from despreading unit 710. Channel selector 730 cycles through the eight SF=8 channels in eight clock cycles and, for each clock cycle, provides one despread symbol for one channel to channel compensation unit 740.

Within channel compensation unit 740, a multiplexer 940a receives the despread symbol $R_{8,i}$ and the conjugated despread symbol $R^*_{8,i}$ for channel $Ch_{8,i}$ from channel selector 730 and provides the proper despread symbol to a multiplier 942a. A multiplexer 940b also receives the despread symbol $R_{8,i}$ and the conjugated despread symbol $R^*_{8,i}$ and provides the proper despread symbol to a multiplier 942b. Multiplier 942a multiplies the despread symbol from multiplexer 940a with either $P^*_0$ or $P_1$ and provides a demodulated symbol to a register 946a. Similarly, a multiplier 942b multiplies the despread symbol from multiplexer 940b with either $P_1$ or $P^*_0$ and provides a demodulated symbol to a register 946b. Depending on the controls for multiplexers 940a, 940b, 944a and 944b, register 946a provides either the demodulated symbol $D_{8,i}^0$ or $D_{8,i}^1$ (denoted as $D_{8,i}^{0/1}$) to adders 952a and 952b within symbol combiner 750, and register 946b provides the other demodulated symbol $D_{8,i}^1$ or $D_{8,i}^0$ (denoted as $D_{8,i}^{1/0}$) to adders 952c and 952d.

To achieve the desired throughput of one SF=8 despread symbol per clock cycle, each memory access of symbol buffer 760 is for four SF=16 channels. Even and odd accumulated symbols for four SF=16 channels are retrieved from symbol buffer 760 for each read operation. Even and odd combined symbols for four SF=16 channels are written to symbol buffer 760 for each write operation. The sixteen SF=16 channels are divided into four groups as follows:

Channel group 0: $Ch_{16,0}$, $Ch_{16,1}$, $Ch_{16,2}$, and $Ch_{16,3}$,
Channel group 1: $Ch_{16,4}$, $Ch_{16,5}$, $Ch_{16,6}$, and $Ch_{16,7}$,
Channel group 2: $Ch_{16,8}$, $Ch_{16,9}$, $Ch_{16,10}$, and $Ch_{16,11}$, and
Channel group 3: $Ch_{16,12}$, $Ch_{16,13}$, $Ch_{16,14}$, and $Ch_{16,15}$.

The processing for channel group 0 is described below. When channel selector 730 provides despread symbol $R_{8,0}$ for channel $Ch_{8,0}$, the even and odd accumulated symbols for the four SF=16 channels in group 0 are retrieved from symbol buffer 760, the even accumulated symbols are stored in a register 958a, and the odd accumulated symbols are stored in a register 958b. A multiplexer 954a receives the even accumulated symbols for the first and third SF=16 channels in the group, $Ch_{16,0}$ and $Ch_{16,2}$, and a multiplexer 954b receives the even accumulated symbols for the second and fourth SF=16 channels in the group, $Ch_{16,1}$, and $Ch_{16,3}$. The "k" in FIG. 9 denotes the channel index within the group. A multiplexer 954c receives the odd accumulated symbols for channels $Ch_{16,0}$ and $Ch_{16,2}$, and a multiplexer 954d receives the odd accumulated symbols for channels $Ch_{16,1}$, and $Ch_{16,3}$.

For despread symbol $R_{8,0}$ for channel $Ch_{8,0}$, multiplexers 954a and 954b provide the even accumulated symbols for channels $Ch_{16,0}$ and $Ch_{16,1}$, to adders 952a and 952b, respectively, and multiplexers 954c and 954d provide the odd accumulated symbols for channels $Ch_{16,0}$ and $Ch_{16,1}$ to adders 952c and 952d, respectively. Each adder 952 either adds or subtracts the demodulated symbol from an associated register 946 with the accumulated symbol from an associated multiplexer 954 and provides a combined symbol to a register 956. At a designated time, register 956 provides the four combined symbols from adders 952a through 952d (which are for the even and odd symbols for channels $Ch_{16,0}$ and $Ch_{16,1}$) to symbol buffer 760 for storage.

For despread symbol $R_{8,1}$ for channel $Ch_{8,1}$, multiplexers 954a and 954b provide even accumulated symbols for channels $Ch_{16,2}$ and $Ch_{16,3}$ to adders 952a and 952b, respectively, and multiplexers 954c and 954d provide odd accumulated symbols for channels $Ch_{16,2}$ and $Ch_{16,3}$ to adders 952c and 952d, respectively. Each adder 952 either adds or subtracts the demodulated symbol from an associated register 946 with the accumulated symbol from an associated multiplexer 954 and provides a combined symbol to register 956. Register 956 provides the four combined symbols for channels $Ch_{16,2}$ and $Ch_{16,3}$ to symbol buffer 760 for storage.

The processing for other SF=8 despread symbols for channel groups 1, 2, and 3 proceed in similar manner as for channel group 0. When channel selector 730 provides despread symbols for SF=8 channels $Ch_{8,2}$, $Ch_{8,4}$, and $Ch_{8,6}$, symbol buffer 760 provides the even and odd accumulated symbols for the four SF=16 channels in groups 1, 2, and 3, respectively, to multiplexers 954a through 954d. For an even-numbered SF=8 channel, multiplexers 954a through 954d provide the even and odd accumulated symbols for the first pair of SF=16 channels in the group. For an odd-numbered SF=8 channel, multiplexers 954a through 954d provide the even and odd accumulated symbols for the second pair of SF=16 channels in the group.

Figure 10A:
FIGS. 10A and 10B show the pipelined processing by the DDE unit.
Figure 10B:

FIGS. 10A and 10B show the pipelined processing by DDE unit 720 for the STTD mode. In clock cycle 0, the even and odd accumulated symbols for $Ch_{16,0}$ through $Ch_{16,3}$ are retrieved from symbol buffer 760 and stored in registers 958a and 958b. Also in clock cycle 0, the despread symbol $R_{8,0}$ for channel $Ch_{8,0}$ is multiplied with the channel estimates $P^*_0$ and $P_1$, and the demodulated symbols $D_{8,0}^0$ and $D_{8,0}^1$ are stored in registers 946a and 946b. In clock cycle 1, the demodulated symbols $D_{8,0}^0$ and $D_{8,0}^1$ from registers 946a and 946b are combined with the even and odd accumulated symbols for $Ch_{16,0}$ and $Ch_{16,1}$, and the combined symbols are stored in register 956. Also in clock cycle 1, the despread symbol $R_{8,1}$ for channel $Ch_{8,1}$ is multiplied with the channel estimates $P^*_0$ and $P_1$, and the demodulated symbols $D_{8,0}^0$ and $D_{8,0}^1$ are stored in registers 946a and 946b.

In clock cycle 2, the demodulated symbols $D_{8,1}^0$ and $D_{8,1}^1$ from registers 946a and 946b are combined with the even and odd accumulated symbols for $Ch_{16,2}$ and $Ch_{16,3}$, and the combined symbols are stored in register 956. In the same clock cycle, the despread symbol $R_{8,2}$ for channel $Ch_{8,2}$ is multiplied with the channel estimates $P^*_0$ and $P_1$, and the demodulated symbols $D_{8,2}^0$ and $D_{8,2}^1$ are stored in registers 946a and 946b. Also in clock cycle 2, the even and odd accumulated symbols for $Ch_{16,4}$ through $Ch_{16,7}$ are retrieved from symbol buffer 760 and stored in registers 958a and 958b.

In clock cycle 3, the combined symbols for $Ch_{16,0}$ through $Ch_{16,3}$ from registers 956 are stored back to symbol buffer 760. In the same clock cycle, the demodulated symbols $D_{8,2}^0$ and $D_{8,2}^1$ from registers 946a and 946b are combined with the even and odd accumulated symbols for $Ch_{16,4}$ and $Ch_{16,5}$, and the combined symbols are stored in register 956. Also in clock cycle 3, the despread symbol $R_{8,3}$ for channel $Ch_{8,3}$ is multiplied with the channel estimates $P^*_0$ and $P_1$, and the demodulated symbols $D_{8,3}^0$ and $D_{8,3}^1$ are stored in registers 946a and 946b.

As shown in FIG. 10A, the processing for one despread symbol for one SF=8 channel spans four clock cycles. The processing for the despread symbols for the other SF=8 channels proceeds in similar manner. FIGS. 10A and 10B also show a throughput rate of one SF=8 despread symbol per clock period. Symbol buffer 760 is accessed in every even-numbered clock cycle to retrieve accumulated symbols for a group of four SF=16 channels, and accessed in every odd-numbered clock cycle to store combined symbols for a group of four SF=16 channels.

FIG. 11 shows an embodiment of symbol buffer 760 within DDE unit 720. In order to achieve a high data transfer rate needed to support data demodulation of one SF=8 despread symbol per clock period, symbol buffer 760 is implemented with two memory banks 1110a and 1110b. Memory bank 1110a stores the combined symbols for the eight SF=16 channels in groups 0 and 2. Memory bank 1110b stores the combined symbols for the eight SF=16 channels in groups 1 and 3. Each memory bank 1110 stores one slot of combined symbols for all eight SF=16 channels. Since a slot includes 160 symbols for SF=16 in W-CDMA, each memory bank 1110 stores 1280 symbols (i.e., 1280=160×8) for eight SF=16 channels.

Each address location stores two consecutive combined symbols for four SF=16 channels. With the memory architecture shown in FIG. 11, the even and odd symbols for one group of four SF=16 channels can be retrieved from one memory location in one memory bank in one clock cycle. The combined symbols for another group of four SF=16 channels can be written to one location in the other memory bank in the next clock cycle. Memory banks 1110a and 1110b are thus accessed on alternate clock cycles.

Both memory banks 1110a and 1110b are flushed at the start of each slot to set all of the accumulated symbols to zero. This way, the accumulation can be properly performed when the first despread symbol for each recovered data symbol arrives. The recovered data symbols in the memory banks can be processed by RX data processor 162 as soon as the combining is completed.

Referring back to FIG. 10B, after all eight despread symbols for the eight SF=8 channels $Ch_{8,0}$ through $Ch_{8,7}$ for symbol period 2n are processed, the same processing is repeated for the despread symbols for these SF=8 channels for the next symbol period 2n+1, starting on the right side of heavy solid line 1010 in FIG. 10B.

As shown in equations (6) through (9), four demodulated symbols for four consecutive symbol periods 2n through 2n+3 for SF=8 channel $Ch_{8,i}$ are combined to obtain four recovered data symbols for two SF=16 channels $Ch_{16,2i}$ and $Ch_{16,2i+1}$. Table 1 lists (1) the despread symbols provided by multiplexers 940a and 940b and the channel estimates provided by multiplexers 944a and 944b to multipliers 942a and 942b and (2) the operation (either addition or subtraction) performed by each of adders 952a through 952d for each symbol period. The controls for multiplexers 940a and 940b, 944a and 944b, and 954a through 954d are provided by DDE controller 762.

TABLE 1

| Processing Unit | Symbol Period/Despread Symbol | | | |
|---|---|---|---|---|
| | 2n | 2n + 1 | 2n + 2 | 2n + 3 |
| Multiplexer 940a | $R_{8,i,2n}$ | $R_{8,i,2n+1}$ | $R_{8,i,2n+2}^*$ | $R_{8,i,2n+3}^*$ |
| Multiplexer 940b | $R_{8,i,2n}^*$ | $R_{8,i,2n+1}^*$ | $R_{8,i,2n+2}$ | $R_{8,i,2n+3}$ |
| Multiplexer 944a | $P_0^*$ | $P_0^*$ | $P_1$ | $P_1$ |
| Multiplexer 944b | $P_1$ | $P_1$ | $P_0^*$ | $P_0^*$ |
| Adder 952a | + | + | + | + |
| Adder 952b | + | − | + | − |
| Adder 952c | − | − | + | + |
| Adder 952d | − | + | + | − |

Demodulator 160c can also perform data demodulation for the non-STTD mode. In this case, the processing units within symbol combiner 750 are configured to implement equation set (5) for the non-STTD mode. A despread symbol $R_{8,i}$ for an SF=8 channel $Ch_{8,i}$ is multiplied with only one channel estimate P for one antenna to generate one demodulated symbol. Two demodulated symbols for two symbol periods are combined (added and subtracted) to obtain two recovered data symbols for two SF=16 channels $Ch_{16,2i}$ and $Ch_{16,2i+1}$, as shown in equation set (5).

For the embodiment shown in FIGS. 7 through 11, demodulator 160c performs data demodulation on despread symbols for SF=8 channels to obtain recovered data symbols for SF=16 channels. Demodulator 160c combines two consecutive despread symbols for an SF=4 channel $Ch_{4,i}$ to obtain two despread symbols for two SF=8 channels $Ch_{8,2i}$ and $Ch_{8,2i+1}$. Demodulator 160c multiplies the despread symbol for channel $Ch_{8,2i}$ with the channel estimates and combines the demodulate symbols with the accumulated symbols for two SF=16 channels $Ch_{16,4i}$ and $Ch_{16,4i+1}$. Demodulator 160c also multiplies the despread symbol for channel $Ch_{8,2i+1}$ with the channel estimates and combines the demodulated symbols with the accumulated symbols for two SF=16 channels $Ch_{16,4i+2}$ and $Ch_{16,4i+3}$. Demodulator 160c stores the combined symbols for all four SF=16 channels $Ch_{16,4i}$ through $Ch_{16,4i+3}$ back in the symbol buffer.

In an alternative embodiment, a demodulator can perform data demodulation on despread symbols for SF=4 channels to obtain recovered data symbols for SF=16 channels. For this embodiment, the demodulator can multiply a despread symbol for an SF=4 channel $Ch_{4,i}$ with the channel estimates, combine the demodulated symbols with accumulated symbols for four SF=16 channels $Ch_{16,4i}$ through $Ch_{16,4i+3}$, and store combined symbols for these four SF=16 channels back in the symbol buffer.

In general, a demodulator can perform data demodulation on despread symbols for SF=L channels to obtain recovered data symbols for SF=M·L channels, where M>1. Less computation and fewer memory accesses may be required when M=2. For example, data demodulation on SF=8 despread symbols requires less computation and fewer memory accesses than data demodulation on SF=4 despread symbols.

Figure 12:
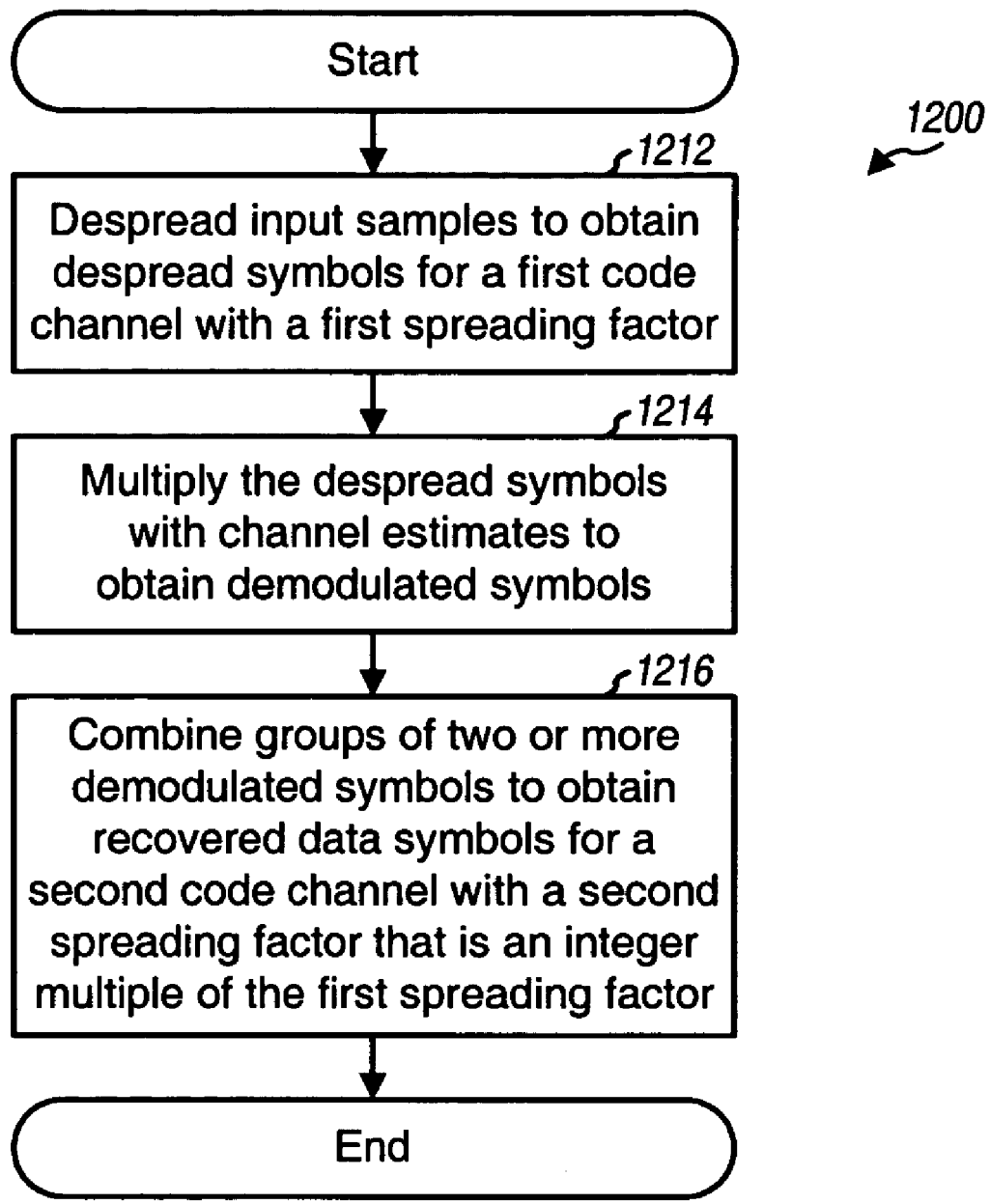
FIG. 12 shows a process for performing data demodulation on partially despread symbols.

FIG. 12 shows a flow diagram of a process 1200 for performing data demodulation on partially despread symbols. Input samples are despread to obtain despread symbols for a first code channel with a first spreading factor L (e.g., SF=L=8) (step 1212). The despread symbols are multiplied with channel estimates to obtain demodulated symbols (step 1214). Groups of demodulated symbols for different symbol periods are then combined to obtain recovered data symbols for a second code channel with a second spreading factor M·L that is an integer multiple of the first spreading factor (e.g., SF=M·L=16, and M=2) (step 1216). For structured orthogonal codes such as OVSF codes, the despread symbols for one first code channel can be used to obtain recovered data symbols for M second code channels.

The channel compensation and symbol combining are dependent on whether the non-STTD or STTD mode is used. For the non-STTD mode, each despread symbol is multiplied with one channel estimate for one antenna to obtain one demodulated symbol. M demodulated symbols for M symbol periods are combined to obtain one recovered data symbol for the second code channel. For the STTD mode, each despread symbol is multiplied with two channel estimates for two antennas to obtain two demodulated symbols. 2·M demodulated symbols for 2·M symbol periods are combined to obtain one recovered data symbol for the second code channel.

The despreading in step 1212, the channel compensation in step 1214, and the symbol combining in step 1216 may be performed for multiple first code channels. The channel compensation and symbol combining may be performed in a TDM and pipelined manner to reduce hardware complexity.

The signal transmitted by base station 110 may reach terminal 150 via multiple signal paths. The received signal at the terminal may thus include a number of multipath components, one multipath component for each signal path. A rake receiver is often used to process a plurality of multipath components in the received signal. The rake receiver typically includes one or more searcher elements (or simply "searchers") that search for strong multipath components in the received signal. The searchers provide the timing and strength of each multipath component found in the received signal. Each multipath component of interest (e.g., of sufficient strength) is then processed to obtain recovered data symbols for that multipath component. The recovered data symbols for all multipath components of interest are combined to obtain final recovered data symbols, which are then processed (e.g., deinterleaved and decoded) to recover the transmitted data.

Demodulator 160c may be operated to process any number of multipath components of interest. Within receiver unit 154, the received samples are stored in a sample buffer so that they may be retrieved and processed multiple times for different multipath components. For each multipath component to be processed, a proper segment of received samples is retrieved from the sample buffer (e.g., based on the timing of the multipath component) and processed to obtain despread symbols that are aligned at the symbol boundary. Each despread symbol is multiplied with channel estimate(s), and the demodulated symbol(s) are combined with the proper accumulated symbols from symbol buffer 760. DDE controller 762 receives timing information for the multipath component being processed and determines the proper accumulated symbols to retrieve from symbol buffer 760 for combining. Symbol buffer 760 also functions as a "deskew" buffer to time-align the symbols for different multipath components for combining.

For clarity, the techniques for performing data demodulation on partially despread symbols have been specifically described for the HS-PDSCHs used for HSDPA in W-CDMA. These techniques may be used for other CDMA systems and standards. For example, these techniques may be used for 1xEV-DV (1x Evolution, Data and Voice), which is a standard that is well known in the art. The techniques described herein may be used with and without transmit diversity (e.g., STTD). The techniques described herein may also be used for the uplink as well as the downlink.

The techniques described herein may be implemented by various means. For example, these techniques may be implemented in hardware, software, or a combination thereof. For a hardware implementation, the processing units used to perform the data demodulation on partially despread symbols may be implemented within one or more application specific integrated circuits (ASICs), digital signal processors (DSPs), digital signal processing devices (DSPDs), programmable logic devices (PIDs), field programmable gate arrays (FPGAs), processors, controllers, micro-controllers, microprocessors, other electronic units designed to perform the functions described herein, or a combination thereof. The techniques may also be implemented on one or more integrated circuits.

For a software implementation, the techniques described herein may be implemented with modules (e.g., procedures, functions, and so on) that perform the functions described herein. The software codes may be stored in a memory unit (e.g., memory unit 142 or 172 in FIG. 1) and executed by a processor (e.g., controller 140 or 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit comprising:
   a despreading unit operative to despread input samples and provide despread symbols with a first spreading factor;
   a channel compensation unit operative to multiply the despread symbols with channel estimates and provide demodulated symbols; and
   a symbol combiner operative to combine groups of demodulated symbols by combining at least one accumulated demodulated symbol with a current demodulated symbol to obtain recovered data symbols for a channel with a second spreading factor that is an integer multiple of the first spreading factor.

2. The integrated circuit of claim 1, wherein the second spreading factor is two times the first spreading factor.

3. The integrated circuit of claim 1, wherein the symbol combiner is operative to combine groups of demodulated symbols to obtain recovered data symbols for a different channel with the second spreading factor.

4. The integrated circuit of claim 1, wherein the channel compensation unit is operative to multiply each of the despread symbols with a channel estimate for one transmitter antenna to obtain one demodulated symbol for the despread symbol.

5. The integrated circuit of claim 4, wherein the symbol combiner is operative to combine groups of two demodulated symbols for two symbol periods to obtain the recovered data symbols for the channel.

6. The integrated circuit of claim 1, wherein the channel compensation unit is operative to multiply each of the despread symbols with channel estimates for two transmitter antennas to obtain two demodulated symbols for the despread symbol.

7. The integrated circuit of claim 6, wherein the symbol combiner is operative to combine groups of four demodulated symbols for four symbol periods to obtain the recovered data symbols for the channel.

8. The integrated circuit of claim 1, wherein the symbol combiner is operative to combine groups of demodulated symbols based on space time transmit diversity (STTD).

9. The integrated circuit of claim 1, wherein the channel is a high-speed physical downlink shared channel (HS-PDSCH) in Wideband Code Division Multiple Access (W-CDMA).

10. The integrated circuit of claim 1, wherein the channel is a packet data channel (PDCH) in IS-2000.

11. A device in a Code Division Multiple Access (CDMA) communication system, comprising:
    a despreading unit operative to despread input samples and provide despread symbols with a first spreading factor;
    a channel compensation unit operative to multiply the despread symbols with channel estimates and provide demodulated symbols; and
    a symbol combiner operative to combine groups of demodulated symbols by combining at least one accumulated demodulated symbol with a current demodulated symbol to obtain recovered data symbols for a channel with a second spreading factor that is an integer multiple of the first spreading factor.

12. The device of claim 11, wherein the channel compensation unit is operative to multiply each despread symbol with channel estimates for two transmitter antennas to obtain two demodulated symbols for the despread symbol, and wherein the symbol combiner is operative to combine groups of four demodulated symbols for four symbol periods to obtain the recovered data symbols for the channel.

13. An apparatus in a Code Division Multiple Access (CDMA) communication system, comprising:
    means for despreading input samples to obtain despread symbols with a first spreading factor;
    means for multiplying despread symbols with channel estimates to obtain demodulated symbols; and
    means for combining groups of demodulated symbols by combining at least one accumulated demodulated symbol with a current demodulated symbol to obtain recovered data symbols for a channel with a second spreading factor that is an integer multiple of the first spreading factor.

14. A processor readable media for storing instructions operable in a wireless device to:
    despread input samples to obtain despread symbols with a first spreading factor;
    multiply the despread symbols with channel estimates to obtain demodulated symbols; and combine groups of demodulated symbols by combining at least one accumulated demodulated symbol with a current demodulated symbol to obtain recovered data symbols for a channel with a second spreading factor that is an integer multiple of the first spreading factor.

15. A method of performing data demodulation in a Code Division Multiple Access (CDMA) communication system, comprising:

despreading input samples to obtain despread symbols with a first spreading factor; multiplying the despread symbols with channel estimates to obtain demodulated symbols; and combining groups of demodulated symbols by accumulating demodulated symbols and by combining the accumulated symbols with the current demodulated symbols to obtain recovered data symbols for a channel with a second spreading factor that is an integer multiple of the first spreading factor.

16. The method of claim 15, wherein the second spreading factor is two times the first spreading factor.

17. The method of claim 15, wherein each of the despread symbols is multiplied with a channel estimate for one transmitter antenna to obtain one demodulated symbol for the despread symbol.

18. The method of claim 17, wherein the combining step combines groups of two demodulated symbols for two symbol periods to obtain the recovered data symbols for the channel.

19. The method of claim 15, wherein each of the despread symbols is multiplied with channel estimates for two transmitter antennas to obtain two demodulated symbols for the despread symbol.

20. The method of claim 15, wherein the combining step combines groups of demodulated symbols based on space time transmit diversity (STTD).

21. The method of claim 15, wherein the channel is a high-speed physical downlink shared channel (HS-PDSCX) in Wideband Code Division Multiple Access (W-CDMA).

22. The method of claim 15, wherein the channel is a packet data channel (PDCH) in IS-2000.

* * * * *